W. F. SPRENGNETHER.
SUN SHIELD FOR AUTOMOBILES.
APPLICATION FILED MAY 20, 1921.
1,427,332.
Patented Aug. 29, 1922.
2 SHEETS—SHEET 1.
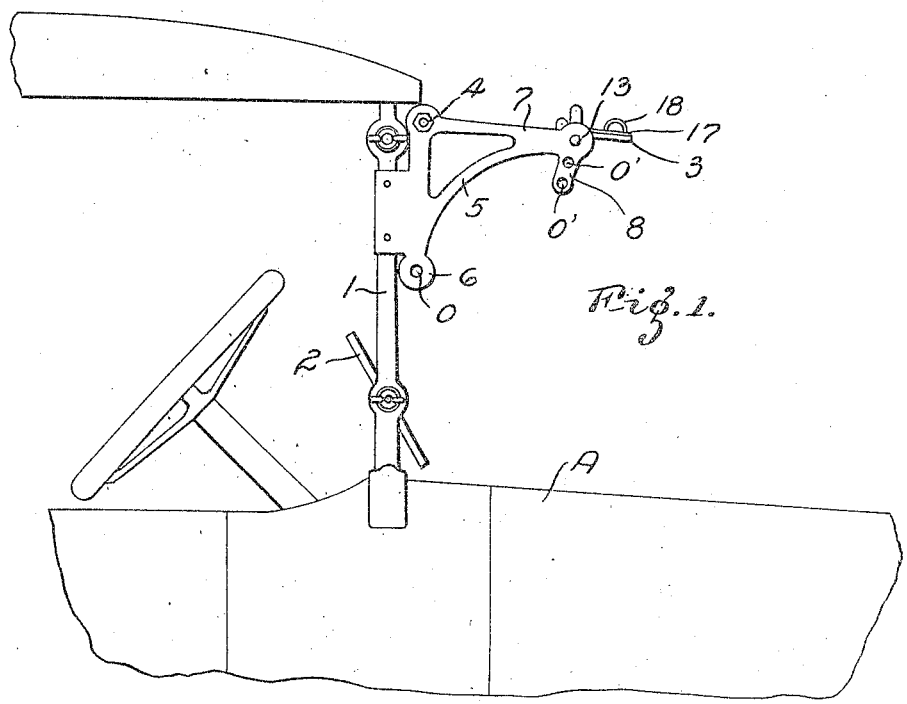
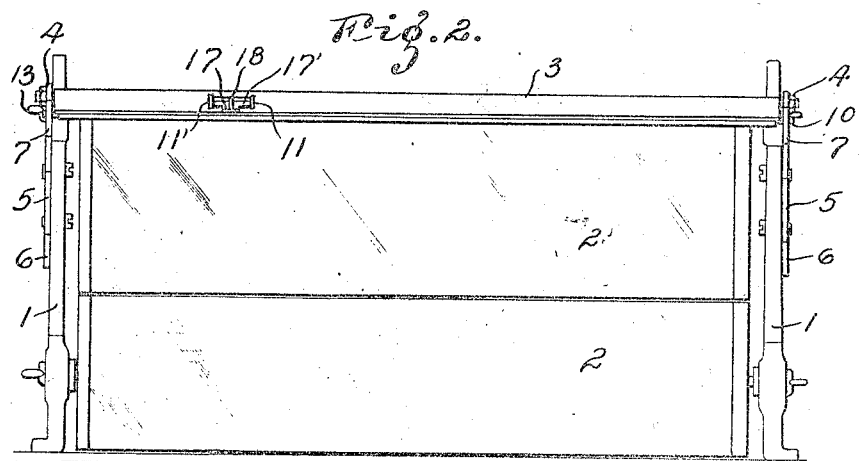
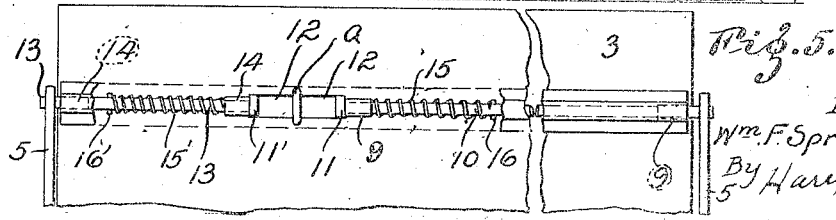
Inventor:
Wm. F. Sprengnether.
By Harry A. Beier
Attorney.

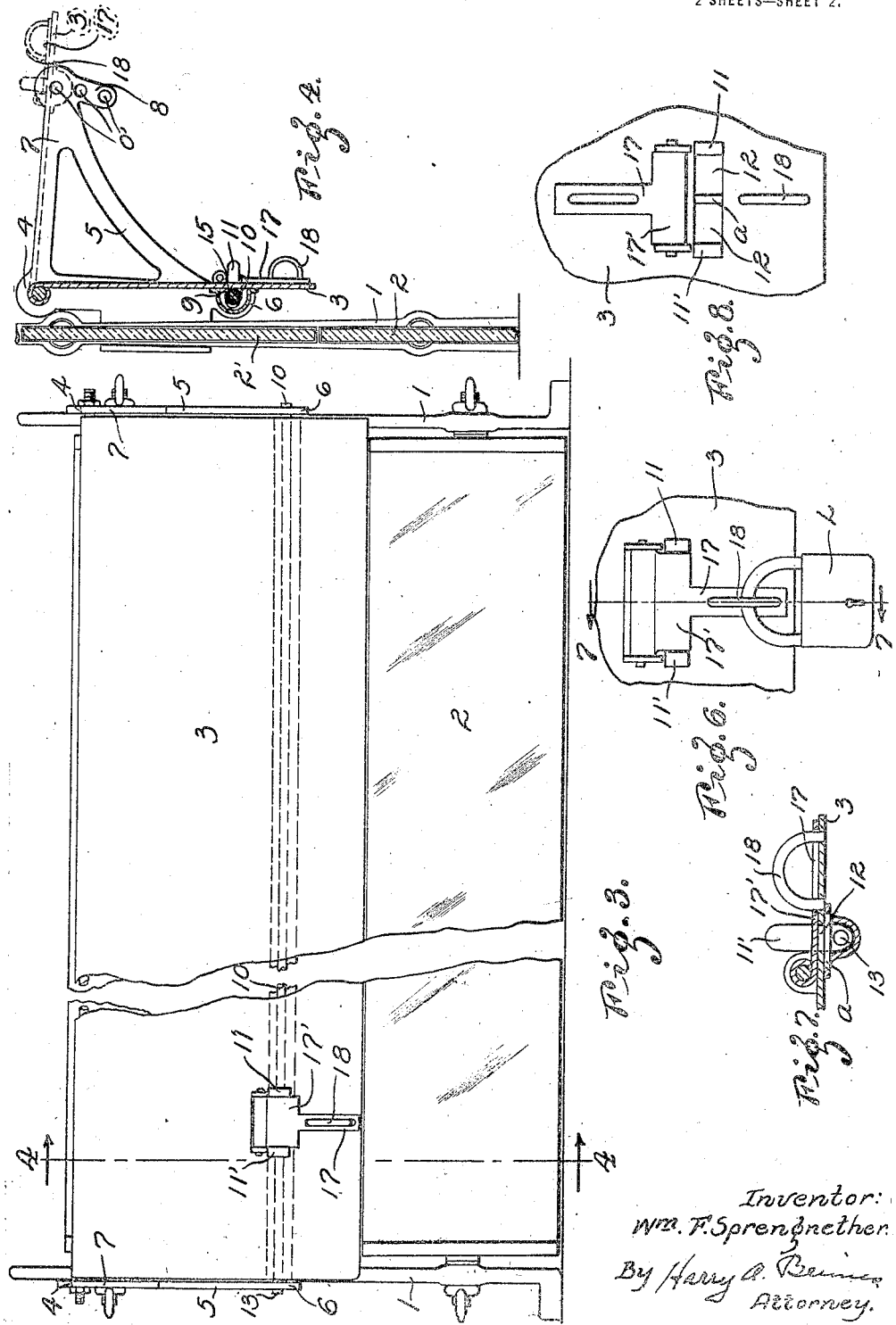

UNITED STATES PATENT OFFICE.

WILLIAM F. SPRENGNETHER, OF ST. LOUIS, MISSOURI, ASSIGNOR OF ONE-HALF TO RICHARD PIRKENSON, OF ST. LOUIS, MISSOURI.

SUN SHIELD FOR AUTOMOBILES.

1,427,332.  Specification of Letters Patent.  Patented Aug. 29, 1922.

Application filed May 20, 1921. Serial No. 471,210.

*To all whom it may concern:*

Be it known that I, WILLIAM F. SPRENGNETHER, a citizen of the United States, residing at St. Louis, State of Missouri, have invented certain new and useful Improvements in Sun Shields for Automobiles, of which the following is a specification.

My invention has relation to improvements in sun-shields for automobiles and consists in the novel details of construction more fully set forth in the specification and pointed out in the claims.

The object of the present invention is to provide a sun-shield that may be applied to any automobile without modifying the construction thereof; one that may be locked in either raised or lowered position, and when locked in lowered position the sun-shield will be disposed over the wind-shield so as to obscure the vision from the driver's seat. Thus when the car is unoccupied unauthorized persons will be prevented from driving the same. A further object is to construct a sun-shield that is simple, consisting of but few parts, and one possessing other and further advantages better apparent from a detailed description of the invention in connection with the accompanying drawings in which—

Figure 1 is a side elevation of a portion of an automobile showing my invention applied thereto; Fig. 2 is a front view of my improved sun-shield applied to the windshield standards, the sun-shield being raised; Fig. 3 is a front elevation of the sun-shield lowered in front of a large part of the windshield, part being broken away; Fig. 4 is a vertical cross-section on the line 4—4 of Fig. 3; Fig. 5 is a bottom view of a part of the shield showing the locking rods and housing therefor; Fig. 6 is an enlarged view of the locking mechanism for the rods; Fig. 7 is a cross-sectional detail on the line 7—7 of Fig. 6; Fig. 8 is a view similar to Fig. 6 with the locking hasp raised.

Referring to the drawings, A represents an automobile provided with the usual windshield standards 1, 1 between which are mounted the sections 2, 2' of the wind-shield, as well understood in the art.

In order that the eyes of the driver may be shielded from the sun, I provide a sunshield 3, pivotally mounted in bearings 4, 4 formed at the top of suitable brackets 5, 5 screwed, or otherwise secured, to the windshield standards 1, 1.

The brackets 5, 5 are provided with lobes 6, 6 adjacent the standards 1, 1 and in each lobe is a hole $o$; and the brackets are formed with horizontal arms 7, 7 which have arcuate depending portions 8, 8 on their extremities in each of which is a series of holes $o'$. On the underside of the shield 3, near the free edge thereof is a pair of bearings 9, 9 and mounted in these bearings is a rod 10 terminating at its inner end in an ear 11 projecting through a slot 12 in the shield 3. A second rod 13 is mounted in bearings 14, 14 on the shield and in alinement with bearings 9, 9, the rod 13 also terminating at its inner end in an ear 11' which projects through the slot 12. The rods 10 and 13 have springs 15, 15' coiled about them, the spring 15 operating between the inner bearing 9 and a pin 16 in the rod 10 and the spring 15' operating between the inner bearing 14 and a pin 16' in the rod 13. It will be seen by referring to Figures 5 and 6 that the springs 15, 15' keep the rods 10 and 13 forced outwardly, the ends of the rods extending beyond the ends of the shield 1, and the ears 11, 11' bearing against the edges of the slot 12. Hinged to the top or outer surface of the shield 1, and contiguous to the inner edge of the slot 12 is a hasp 17 adapted to pass over an eye or staple 18 secured in the shield on the side of the slot 12 opposite the hasp. The hasp has a rectangular body portion 17' substantially the same width as the space between the ears 11, 11' when the rods 10 and 13 are extended under influence of the springs. Now when the hasp 17 is passed over the staple 18 the ears 11, 11' are confined between the edges of the hasp body and the edges of the slot 12, so that on placing a lock L through the staple it is impossible to move the ears 11, 11' or rods 10, 13. In other words, the rods are locked against movement.

In operating my improved sun-shield the operator presses together the ears 11, 11' with his fingers (there being a partition $a$ through the middle of the slot 12, to insure that both rods will be drawn inwardly the same amount) whereupon the rods 10, 13 will be drawn in until they are inside the inner edge of the brackets 5. The shield 1 may now be swung upwardly (Fig. 1) and the rods released to enter any pair of the openings o', after which the hasp is dropped over the staple and the lock inserted or not as desired. When the car is being operated, the shield will, of course, be raised. However, should the driver desire to park his car for an extended period, he releases the rods from the openings o', and drops the shield down until the rods are in alinement with the openings o, when the rods are released into the openings and the hasp locked over the staple. The wind-shield is now largely covered by the shield 1 so that should an unauthorized person want to drive the car he will be unable to do so because his vision is obscured by the shield 1 which lies in a plane just in front of the wind-shield.

In sedans or other types of bodies where the wind-shield is mounted in a frame, the standards 1, 1 being dispensed with, the brackets 5, 5 may be mounted directly to this frame.

From the above it will be apparent that I have provided a simple device which combines the function of an automobile lock and sun-shield, and consists of comparatively few parts.

Having described my invention, I claim:

1. A sun-shield for automobiles provided with brackets mounted on both sides at the front of the automobile, a shield pivotally mounted between said brackets, spring-controlled rods mounted on the shield and projecting outwardly from the ends thereof, said rods being adapted to enter openings in the brackets for holding the shield in position, the inner ends of said rods being provided with ears projecting through an opening in the shield, a hasp pivoted to the shield and adapted to be positioned between said ears, and means for locking said hasp against displacement.

2. A sun-shield for automobiles provided with brackets mounted on both sides at the front of the automobile, a shield pivotally mounted between said brackets, spring-controlled rods mounted on the shield and projecting outwardly from the ends thereof, said rods being adapted to enter openings in the brackets for holding the shield in position, means interposed between the rods for holding them against movement, and a lock for said holding means.

In testimony whereof I hereunto affix my signature.

WILLIAM F. SPRENGNETHER.